UNITED STATES PATENT OFFICE.

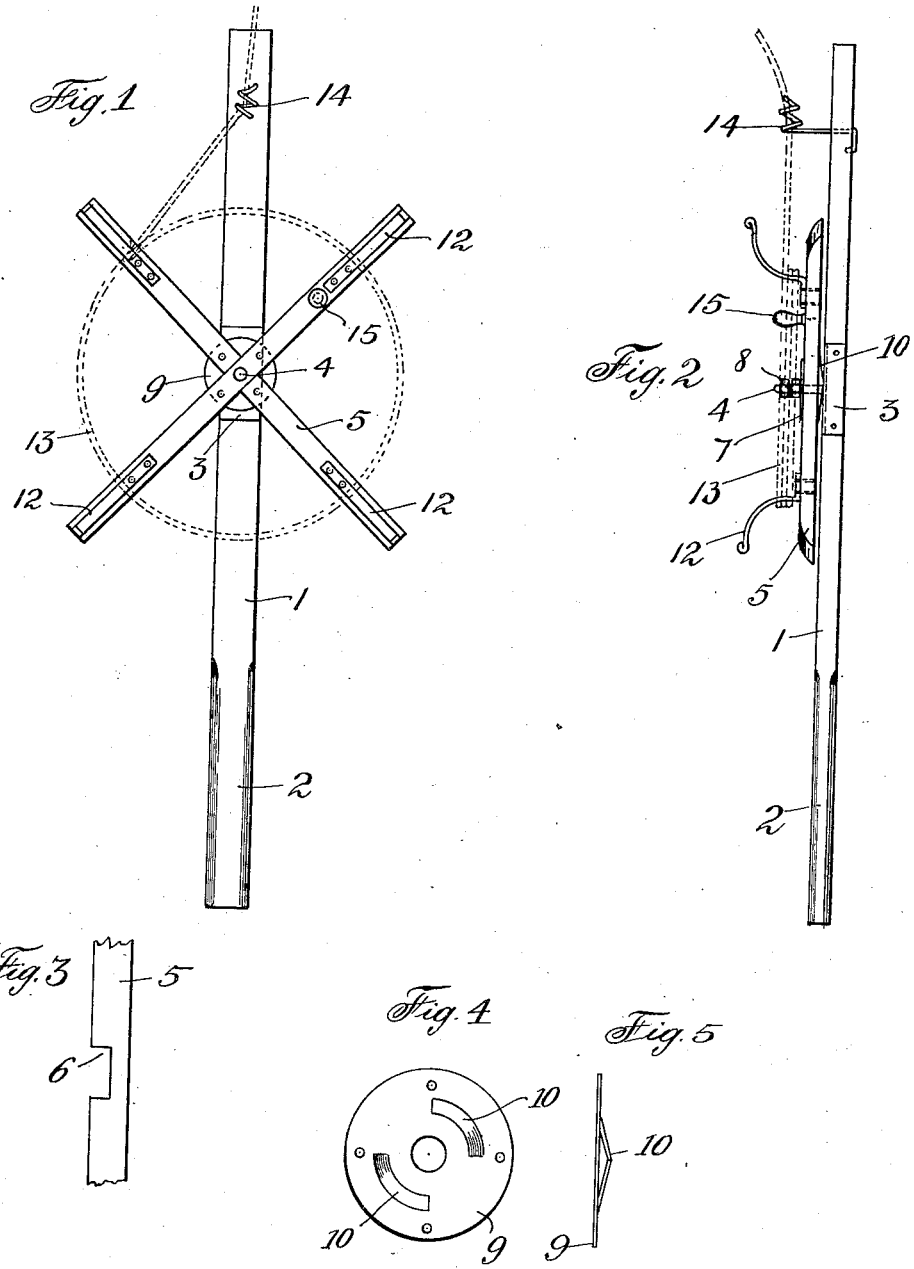

SVEN A. JULIEN, OF CHICAGO, ILLINOIS.

CLOTHES-LINE REEL.

1,082,637.  Specification of Letters Patent.  Patented Dec. 30, 1913.

Application filed December 3, 1910. Serial No. 595,330.

*To all whom it may concern:*

Be it known that I, SVEN A. JULIEN, a citizen of the United States, and residing at Chicago, in the county of Cook and State of Illinois, have invented a new and useful Improvement in Clothes-Line Reels, of which the following is a complete specification.

The main objects of this invention are to provide a clothes-line reel which is adapted to hold the clothes-line when not in use; to provide a clothes-line reel upon which the line is adapted to be quickly wound or unwound; to provide an improved clothes-line reel which is adapted to be held in one hand by the operator and to be operated by the other hand; and to provide a cheap, simple and durable construction of clothes-line reel which is adapted to normally hold the line from unwinding.

A specific embodiment of the invention is illustrated in the accompanying drawings, in which:

Figure 1 is a front elevation of a clothes-line reel embodied in the invention, with parts removed. Fig. 2 is a side elevation of the reel. Fig. 3 is a fragmentary side elevation of one of the cross-arms. Fig. 4 is a front elevation of the brake plate. Fig. 5 is a side elevation of the brake plate.

In the construction shown, the support-bar 1 is provided at one end with a handle 2 by means of which the reel is held and carried in operative position, and the bar is provided on one side, near its center, with a bearing plate 3 from which extends a forwardly directed axle 4.

A pair of cross-arms 5 are mortised or notched together by cutting a mortise 6 half way through each arm, as shown in Fig. 3, at points equidistant from the ends of the arms. Said arms are provided with an aperture or bearing at their points of intersection and are journaled on said axle.

On the outer end of the axle is a washer or plate 7 and nuts 8, or other means adapted to hold the arms on the axle. Rigidly secured on the rear sides of the arms is a brake plate 9 which is apertured for the axle to pass therethrough, and is provided with outwardly bent resilient tongues or loops 10 which are adapted to bear on the bearing plate 3. When the nuts 8 are set up on the axle 4, they tend to compress the loops or tongues 10 against the bearing plate and thereby regulate the frictional resistance between the tongues and the bearing plate.

Near the ends of each arm are line brackets 12, which are preferably formed of metal and are secured at their rear ends to the arms. Said brackets extend outwardly from the front faces of the arms and longitudinally of the arms toward the ends thereof, thereby affording a space between the outer ends of the arms and the brackets in which the clothes-line 13 may be wound.

On the end of the bar 1 opposite from the handle 2 is a guide loop or eye 14 through which the line 13 passes to guide it onto the brackets.

On one arm, at a point distant from the axle 4 is a handle 15 by means of which the reel may be turned to wind up the line.

The operation of the construction shown is as follows: When it is desired to wind the clothes-line on to the reel, one end of the line is passed through the eye 14 and is secured to one of the brackets 12. The support-bar is then held by its end 2 and the reel is turned by means of the handle 15 until the line is wound up. When it is desired to unwind the line, the line is pulled through the eye 14 in the direction away from the reel, thereby causing the reel to revolve to unwind the line. The friction of the brake tongues 10 against the bearing plate prevents the reel from revolving too fast, and ordinarily said friction is sufficient to support the reel and prevent further unwinding when a sufficient quantity of line has been unwound and attached to its fastenings, thereby permitting the reel to hang from the line. The frictional engagement of the tongues 10 on the plate 3 may be varied by adjusting the nuts 8 on or off the axle.

While I have shown and described but one specific embodiment of the invention, it will be understood that various details of the construction shown may be varied or omitted without departing from the scope of the claims.

I claim:

In combination, a clothes line reel having cross arms, a single substantially straight supporting handle bar, a short stub shaft connected to the bar at one side thereof and bearing thereon the cross arms, brackets on said cross arms so placed as to make the diameter of the reel wider than the length of the stub shaft, and a line guide on the bar.

In witness whereof I have hereunto subscribed my name in the presence of two witnesses.

SVEN A. JULIEN.

Witnesses:
JERRY H. CLARK,
ROBT. KLOTZ.

Copies of this patent may be obtained for five cents each, by addressing the "Commissioner of Patents, Washington, D. C."